(12) United States Patent
Yang

(10) Patent No.: US 6,385,372 B1
(45) Date of Patent: May 7, 2002

(54) FIBER OPTICAL COUPLER FABRICATION AND SYSTEM

(75) Inventor: Yawen Yang, San Jose, CA (US)

(73) Assignee: Tera Fiberoptics, Inc., Sunnyvale, CA (US)

( * ) Notice: Subject to any disclaimer, the term of this patent is extended or adjusted under 35 U.S.C. 154(b) by 0 days.

(21) Appl. No.: 09/552,079

(22) Filed: Apr. 19, 2000

(51) Int. Cl.$^7$ .................................................. G02B 6/26
(52) U.S. Cl. .............................. 385/43; 385/45; 385/96; 385/39
(58) Field of Search .............................. 385/43–48, 96, 385/24, 39

(56) References Cited

U.S. PATENT DOCUMENTS

| | | | |
|---|---|---|---|
| 5,121,453 A | * 6/1992 | Orazi et al. ..................... | 385/43 |
| 5,491,764 A | * 2/1996 | Hu et al. ........................ | 385/43 |
| 5,809,190 A | 9/1998 | Chen ............................ | 385/43 |
| 5,949,936 A | 9/1999 | Chen ............................ | 385/50 |
| 5,987,201 A | 11/1999 | Chen ............................ | 385/43 |
| 6,031,948 A | 2/2000 | Chen ............................ | 385/24 |
| 6,134,362 A | * 10/2000 | Au-Yeung et al. ............. | 385/43 |

OTHER PUBLICATIONS

F. Bilodeau, et al.; Compact, low–loss, fused biconical taper couplers: overcoupled operation and antisymmetric supermode cutoff; Optical Letters/vol. 12 No. 8/Aug. 1987; pp. 634–636.

Matthew N. McLandrich, et al.; Polarization Independent Narrow Channel Wavelength Division Multiplexing Fiber Couplers for 1.55 μm; Journal of Lightwave Technology, vol. 9 No. 4, Apr. 1991, pp. 442–447.

I. J. Wilkinson & C. J. Rowe; Close–Spaced Fused Fibre Wavelength Division Multiplexers With Very Low Polarisation Sensitivity; *Electronics Letters*, Mar. 15, 1990, vol. 26, No. 6, pp. 382–384.

* cited by examiner

Primary Examiner—Cassandra Spyrou
Assistant Examiner—Fayez Assaf
(74) Attorney, Agent, or Firm—John F. Schipper

(57) ABSTRACT

Method for producing a stable, multi-port fiber optic coupler that is useful for wavelength division multiplexing (WDM). The system response is substantially independent of signal polarization and is reasonably stable against mechanical stresses and elevated temperatures. Contiguous sections of two or more fiber optic lines are alternately heated and elongated and are twisted according to selected process parameters for selected time intervals. The fabrication procedure uses a combination of fiber heating at two or more distinct temperatures, fiber elongation and fiber twisting, applied to two or more contiguous fiber optic lines, to produce a fused fiber optic coupler with controllable wavelength discrimination and controllable signal power coupling into each output branch of the fiber optic coupler. ITU standards for wavelength discrimination and wavelength centering in a fiber optic coupler can be met by adjustment of the process parameters.

9 Claims, 6 Drawing Sheets

FIBER OPTICAL COUPLER FABRICATION AND SYSTEM

FIELD OF THE INVENTION

This invention relates to fabrication of a fiber optic coupler and use in a wavelength division multiplexer.

BACKGROUND OF THE INVENTION

In 1981, Kawasaki, Hill and Lamont discussed a "Biconical-taper single mode fiber coupler" (Optics Letters, vol. 6, 1981, p. 327) and the possible use of this device as a beam splitter. Several workers have subsequently examined, and improved upon, a fused biconical taper coupler (FBTC) that fuses two fiber optic lines and provides optical coupling between an input fiber line and one or more output fiber lines.

Bilodeau, Hill, Johnson and Faucher (Optics Letters, vol. 12, 1987, pp. 634–636) have discussed the characteristics of the "pull signature" of an FBTC: as the fused region of two side-by-side fiber optic lines is elongated, each of the amount of signal power that passes along the input fiber and the amount of signal power that passes along the second fiber oscillates with decreasing period, and the sum of these two power values is close to, but less than 1.0 at any elongation value. A small fraction of signal power is lost and does not appear in either fiber. When light having a wavelength $\lambda$ in a selected range is launched into the input fiber, the coupling coefficient, representing fractional power in the second fiber, oscillates approximately periodically as $\lambda$ varies in this range. This wavelength dependence of coupling coefficient in a limited range of wavelength has been proposed as the basis of a wavelength division multiplexer (WDM), wherein each of the two fibers will carry strong signals with different wavelengths.

McLandrich, Orazi and Marlin (Jour. Lightwave Technology, vol. 9, 1991, pp. 442–447) have proposed a polarization-independent, narrow channel WDM fiber coupler that might operate at a signal wavelength $\lambda=1.55$ $\mu$m. The coupler includes two single mode fibers, fused along a selected length, then elongated and tapered so that the cross-sectional shape of the two fibers varies from two approximate circles to one approximate ellipse. Because the signal propagation parameters are not the same for the two transverse polarization directions, this coupler manifests birefringence, and the fraction of signal power coupled into the second fiber will not be the same for the two polarizations.

Wilkinson and Rowe (Electronics Letters, vol. 26, pp. 382–384) have discussed the possibility of applying a twist to a fused assembly of fiber optic lines, for control of signal polarization dependence, but few experimental details are given.

Some of the WDM fiber configurations considered by different workers may be unstable against changing mechanical stress and/or in high temperature environments.

What is needed is a fiber optic system, and method for fabrication, that provides a controllable amount of signal power in each of two or more fiber lines, that is reasonably stable against applied mechanical stress and elevated temperatures, that is substantially independent of signal polarization, that has relatively low power loss, that provides signal wavelength discrimination in each output fiber line and that meets the ITU standards for wavelength division multiplexing.

SUMMARY OF THE INVENTION

These needs are met by the invention, which provides a method for fabrication of the desired system. Two or more fiber optic lines, one being a signal input and output line and a second being an auxiliary output line, are positioned contiguous and parallel to each other along an alignment axis over a selected section of each line. Within the selected section: (1) the fiber lines are alternatively heated to a selected temperature T1 and elongated by a selected fraction f of the original length within certain time intervals having selected temporal lengths and measured in order to evaluate compliance with certain ITU standards for wavelength discrimination in a fiber optic coupler; (2) the fiber line temperature is reduced to a second temperature T2 within a second time interval having a selected temporal length; and (3) the fiber lines are twisted about each other by a selected rotational angle within a third time interval having a selected temporal length. The measured optical performance of the resulting fiber optic coupler is brought into compliance with the ITU standards for wavelength discrimination, and the wavelength isolation and polarization independence of the coupler are improved. The resulting fiber optic coupler is allowed to come to room temperature over another time interval.

The resulting fiber optic coupler provides N signal input lines ($N \geq 2$), with one input line being used at any one time, and provides N signal output lines. With the choice N=2, by choice of the selected fraction f of fiber optic line elongation, the fraction of signal power in each of the two output lines can be controlled; for example, about 50 percent power in each output line, or a selected power split, such as 10/90, in the two output lines. Choice of the fraction f also determines a sequence of wavelengths, within each output line and possibly differing for each fiber optic line, that are propagated with little or no optical loss in that line. By suitable choices of the fabrication parameters, the channel isolation of the fiber optic coupler is improved, the signal output is made less dependent upon the polarization of the input signal, and the coupler can be made reasonable stable against mechanical stress and against temperature variations.

DESCRIPTION OF BEST MODES OF THE INVENTION

Figure 1:
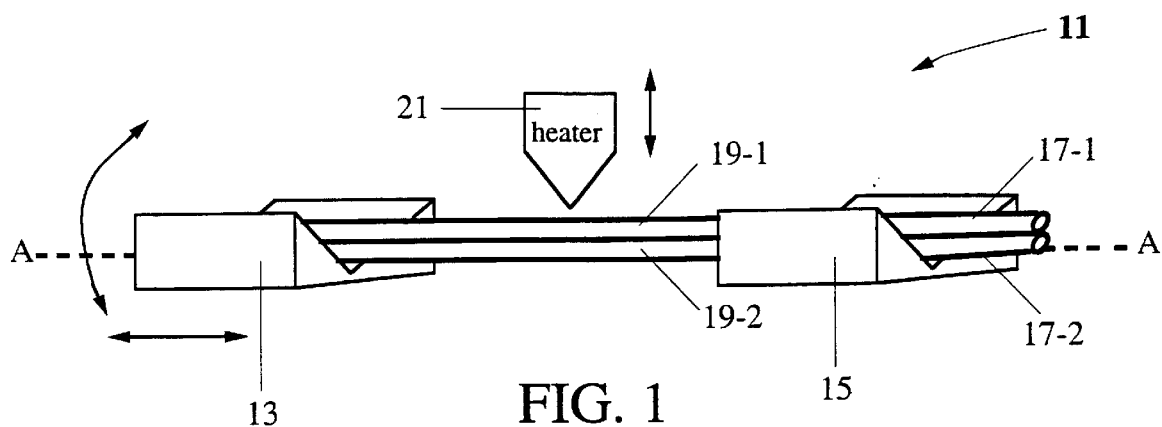
FIGS. 1 and 2 illustrate a suitable system for fabricating a fiber optic coupler according to the invention.

FIG. 1 illustrates apparatus 11 for fabricating a fiber optic coupler according to the invention. The apparatus 11 includes a pair of fiber optic gripping and alignment devices, 13 and 15, such as vacuum chucks, that each accept and align two or more fiber optic (FO) lines or strands 17-i (i=1, 2, ... N) along a common alignment axis AA. The FO lines 17-i are contiguous and substantially parallel to each other. First ends of each FO line and second ends of each FO line are gripped and held by the gripping devices, 13 and 15, respectively, where at least one gripping device 13 is movable, can be translated parallel to the axis AA and/or can be rotated about the axis AA. The gripping blocks, 13 and 15, are spaced apart by a selected distance d0 so that a central section 19-i of each FO line 17-i is exposed. In a preferred embodiment, the initial distance d0 initially lies in a selected range, such as 30 mm≦d0≦40 mm; for example, d0=38 mm; and this separation distance can be increased to a much larger distance d, up to 100 mm or larger, if desired.

The gripping device 13 should be capable of elongating the central section 19-i of each of the FO lines by a selected fraction f, which may lie in the range 0.001≦f≦1.0, or larger if desired, for a selected elongation time interval. Typically, the gripping device 13 increases the separation distance d by a rate such as 50–200 $\mu$m per second, but the separation rate can be greater or less, if desired. Preferably, at some point in time, the gripping device 13 stops moving and holds the separation distance d constant for a selected elongation plateau time interval. A protective coating on each FO line 17-i is removed over a selected first portion of, or all of, the central section 19-i of that line for example, over a section of length≈25 mm of a central section 19-i of length 38 mm.

An FO line heater 21 is positioned adjacent to the central section 19-i of each FO line 17-i and is movable in and out relative to the central sections of the FO lines. When the heater 21 is positioned relative close to an FO central section 19-i, the heater can expose and raise the temperature of a selected second portion of this central section to a first temperature T1 in a selected first temperature range, such as 1000° C.≦T≦1150° C., for a selected first heating time interval, for example, T1=1050° C. The selected second portion of the central section 19-i will lie within the first portion of the central section and may have a length of 4–10 mm, if the first portion has a length of about 25 mm.

The first temperature T1 is chosen to encourage the contiguous FO lines to fuse within the second portion of the central section 19-i. When the heater 21 is positioned relative close to an FO central section 19-i, the heater 21 should be capable of reducing the temperature of the central section 19-i of an FO line 17-i to a second temperature T2 that lies in a second temperature range, such as 800° C.≦T≦950° C. for a selected second heating time interval; for example, T2=875° C.

The gripping device 13 can also be rotated to rotate or twist the first end of the FO lines 17-i relative to the second end of that FO line about the axis AA, by a selected angular displacement $\Delta\theta$, for a selected rotation time interval. The angular displacement $\Delta\theta$ will lie in a selected angular displacement range, such as 360≦$\Delta\theta$≦1080°, and more preferably in a range 720°≦$\Delta\theta$≦900°, as illustrated in the end view of two FO lines shown in FIG. 2.

Figure 3:
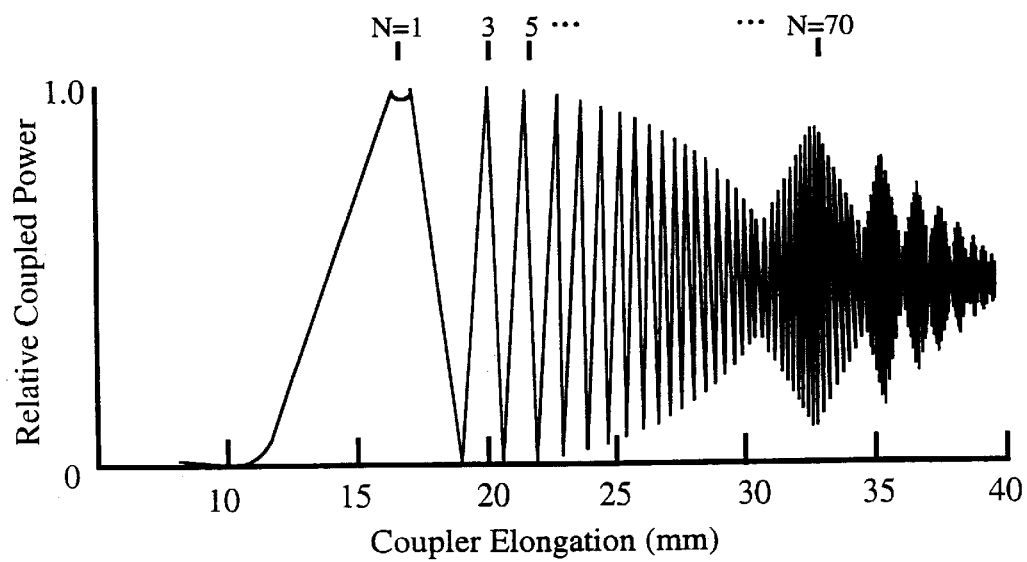
FIG. 3 graphically illustrates coupled signal power in a fiber optic coupler prepared according to the invention.

FIG. 3 graphically illustrates some results reported in the literature for relative coupled power (McLandrich et al, op cit); the "pull signature" for the fraction of signal power coupled into an output FO line) in a two-line fiber optic coupler prepared according to the invention. The power coupled into the input FO line oscillates between approximately 0.0 and 1.0 as the separation distance d is increased for the selected section 19-i of each FO line 17-i (FIG. 1), with an oscillation period that decreases as d increases. For the experimental curve shown in FIG. 3, the torch toggle length is 3 mm and the interrogation wavelength is 1.55 $\mu$m.

Figure 4A:
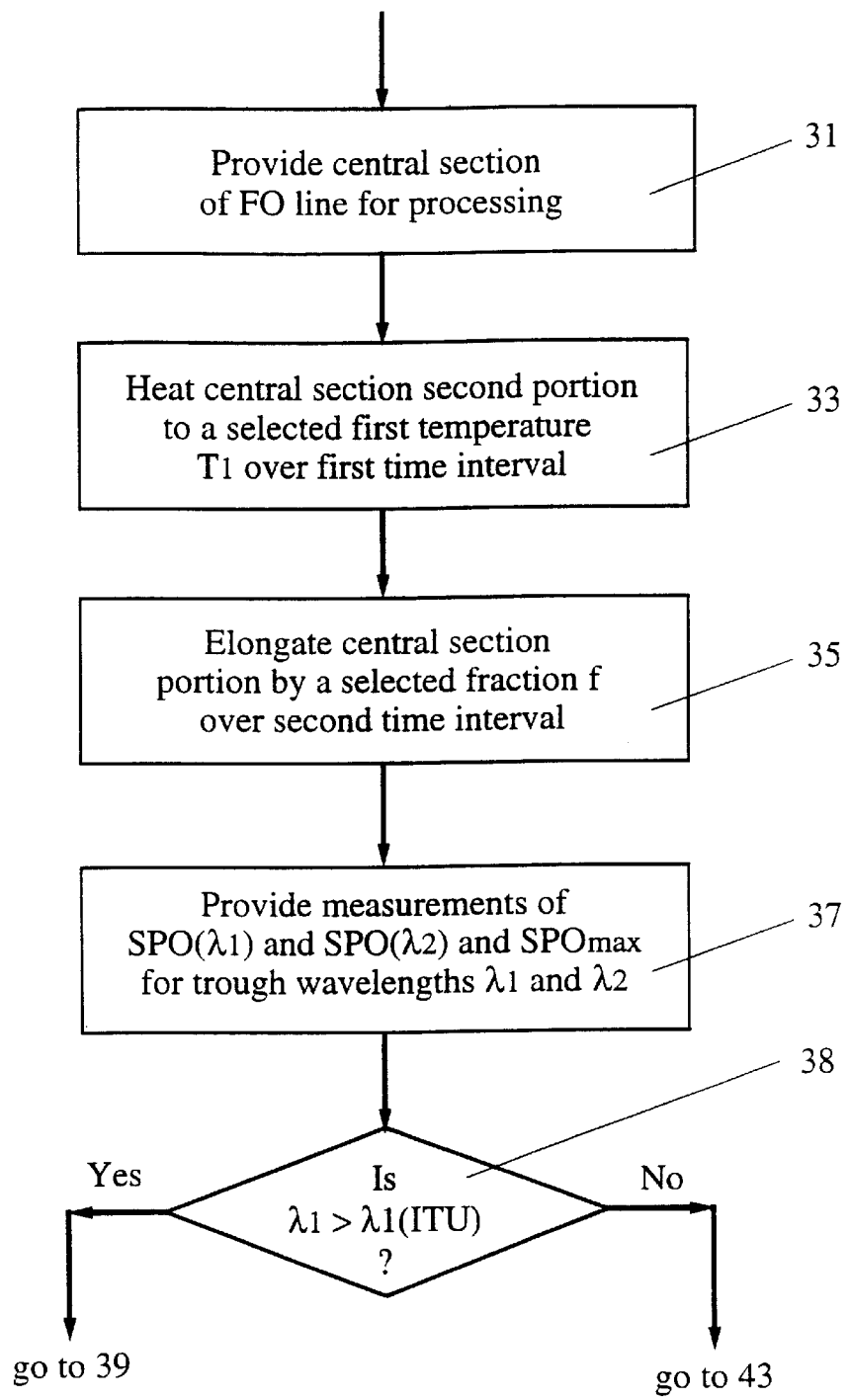
FIG. 4 is a chart of a procedure for practicing the invention.
Figure 4B:
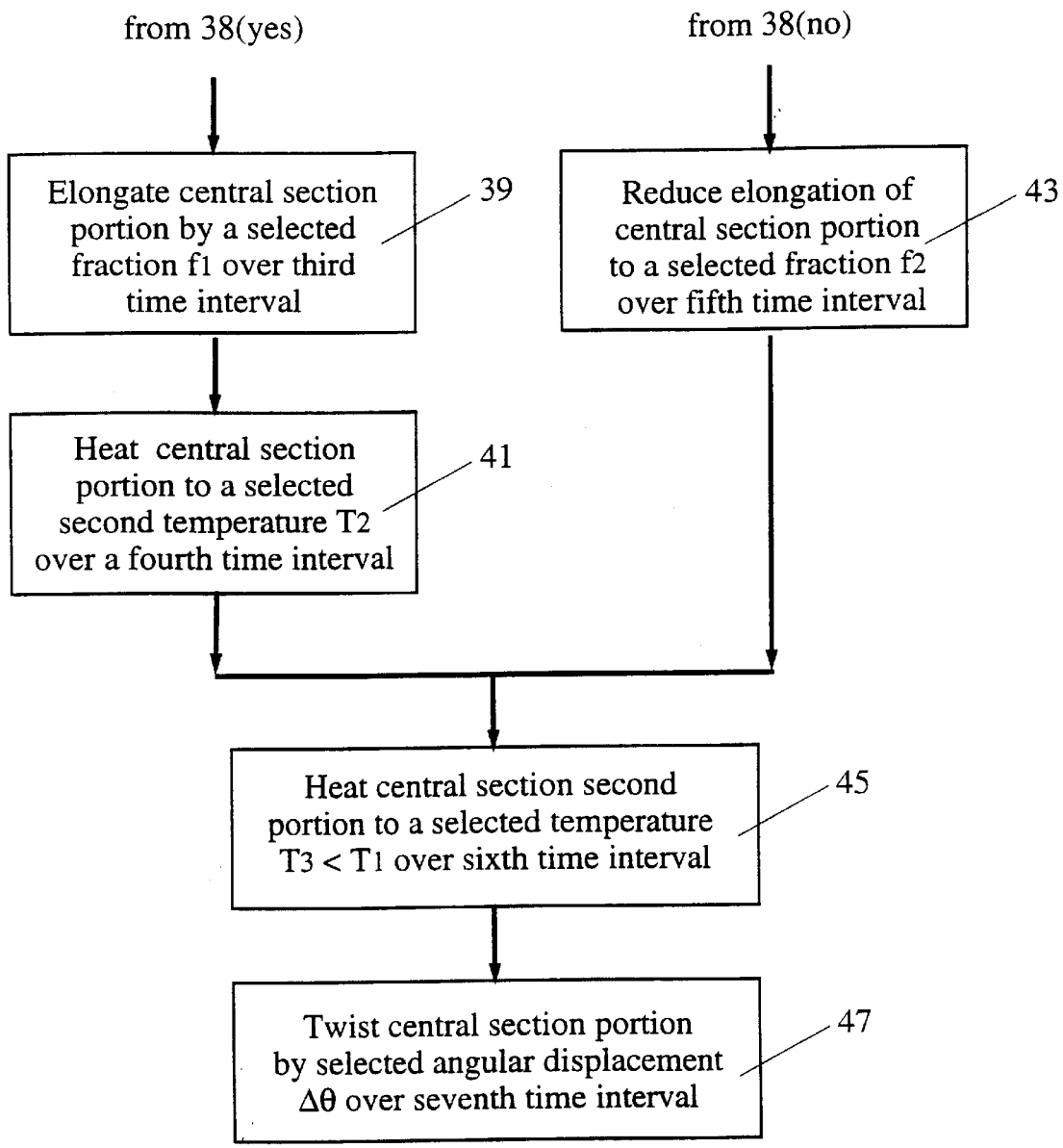

FIG. 4 is a flow chart illustrating a suitable procedure for practicing the invention. In a first process 31, a selected first portion of a central section of each of two or more contiguous FO lines is prepared for processing, preferably by removing the FO line protective coating. In a process 33, a selected second portion of each FO line is heated to the selected first temperature T1 over a selected first heating time interval with preferred temporal length $\Delta t1$ in a selected range (e.g., 0.5–3 sec); heating is then terminated. In a process 35, which preferably overlaps part or all of the first heating time interval, one or both of the gripping devices 13 and 15 are moved apart from each other so that the initial length d0 of the central section 19-i increases to a new length d1≈2·d0, with d1 lying in a selected range such as 70 mm≦d1≦80 mm; this elongation occurs in a first elongation time interval with a preferred temporal length $\Delta t2$ in a selected range (e.g., 1–10 sec. As a result of this elongation of the central section 19-i of an FO line, the length of the first portion of the central section will increase by a factor of about 2 as well, for example from about 25 mm to about 50 mm.

Figure 5A:
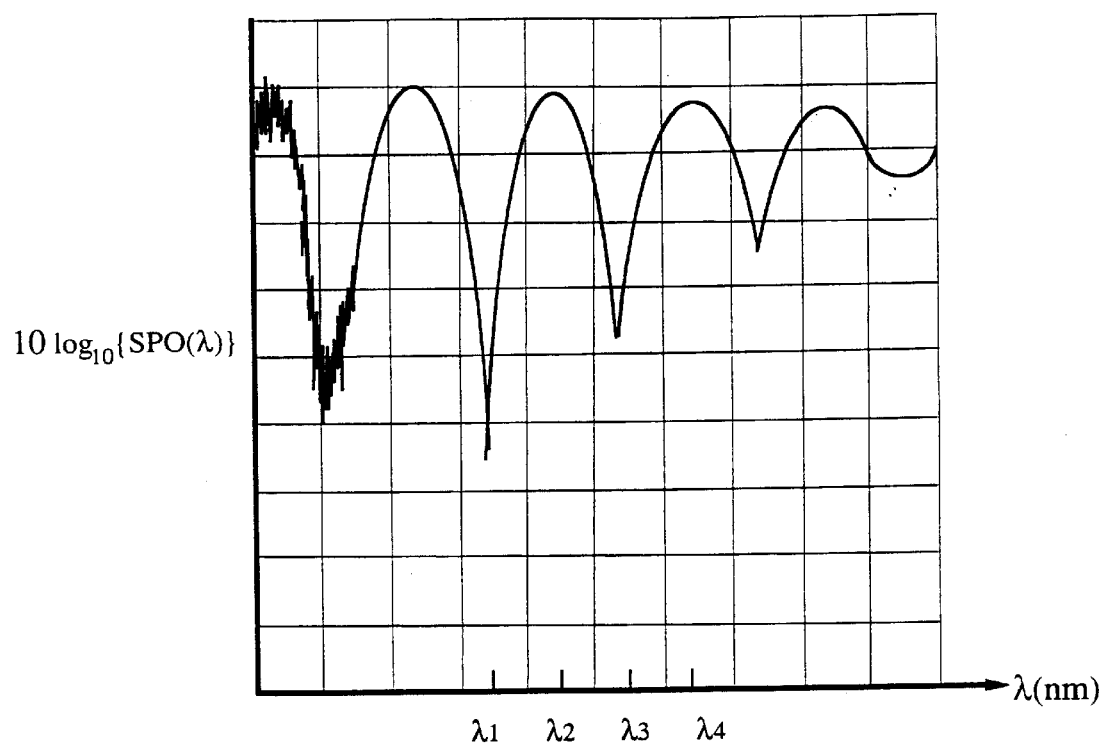
FIGS. 5A and 5B graphically illustrate wavelength dependence of signal power output, without and with application of twist to the fiber optic coupler according to the invention.

At this point, some measurements of signal power output SPO($\lambda$) in one of the output FO lines are made at one or more selected wavelengths $\lambda$. These measurements will produce a graph of SPO($\lambda$) versus $\lambda$ such as shown in FIG. 5A, where SPO($\lambda$) manifests a sequence of pronounced local minima ("pits" or troughs) in certain wavelength regions, $\lambda=\lambda1$ and $\lambda=\lambda2$. For example, at the wavelengths $\lambda=\lambda3$ and $\lambda=\lambda4$, the signal power output SPO(1) is approximately equal to its maximum value $SPO_{max}$; and at the wavelength $\lambda=\lambda1$ and $\lambda=\lambda2$, the pit wavelength values (local minima for SPO($\lambda$)) are below $SPO_{max}$ by amounts corresponding to isolation factors in that FO line of $$ISOL(\lambda1)=10 \log\{SPO(\lambda1)/SPO_{max}\}=-17 \text{ dB}$$

and $$ISOL(\lambda2)=10 \log\{SPO(\lambda2)/SPO_{max}\}=-11 \text{ dB},$$

respectively. The International Telecommunications Union (ITU) has proposed some isolation standards at each of two or more selected wavelengths $\lambda1$(ITU) and $\lambda2$(ITU), with a specified pit-to-pit spacing of $\lambda2$(ITU)−$\lambda1$(ITU)=$\Delta\lambda$(ITU) (e.g., 12.8 nm). The pit values, SPO($\lambda1$) and SPO($\lambda2$), and the pit-to-pit spacing, $\lambda2$(ITU)−$\lambda1$(ITU), are measured in a process 37. In a typical situation, the pit-to-pit spacing will be greater than the ITU spacing standard.

If $\lambda1>\lambda1$ (ITU), the system executes elongation (by a selected small amount) without heating over a first adjustment time interval having a selected temporal length $\Delta t3$ (e.g., 0.1–0.3 sec), in a process 39, in order to move the pit wavelength $\lambda1$ toward the lower wavelength value $\lambda1$ (ITU) (toward the blue). The process 39 may be repeated to move the wavelength pit value $\lambda1$ closer to the specified value $\lambda1$(ITU).

In another process 41, also applicable where $\lambda1>\lambda1$(ITU), the system executes heating to a second temperature T2≈T1 without elongation over a second adjustment time interval having a selected temporal length $\Delta t4$ (e.g., 0.1–0.3 sec), in order to move the pit wavelength $\lambda1$ toward the lower wavelength value $\lambda1$(ITU). The processes 39 and 41 may be repeated, as a pair, to move the wavelength pit value $\lambda1$ closer to the specified value $\lambda1$(ITU). The order of application of the processes 39 and 41 may be reversed, if desired.

If $\lambda1>\lambda1$(ITU), the gripping devices (13 and 15 in FIG. 1) are moved toward each other by a small amount, without heating, over a relaxation time interval having a selected temporal length $\Delta t5$ in a selected range (e.g., 0.1–0.3 sec), in a process 43, and moves the pit-to-pit spacing toward the desired ITU value $\Delta\lambda$(ITU). One or both of the processes 39 and 41 can be applied to move the pit wavelength value $\lambda 1$ toward shorter wavelengths, if needed, if the process 43 raises the wavelength value $\lambda 1$ above the desired value $\lambda 1$(ITU).

In a process 45, the second portion of the center section 19-i of each FO line 17-i is heated to a third (reduced) temperature T3 lying in a selected anneal temperature range (e.g., 800° C.$\leq$T3$\leq$950° C.) over an anneal time interval having a selected temporal length $\Delta t6$ in a selected range (e.g., 0.5–2 sec). At this point, it is likely that the isolation factors ISOL($\lambda 1$) and ISOL($\lambda 2$) will not have changed much, if at all, from the values found experimentally in the process 37.

Figure 2:
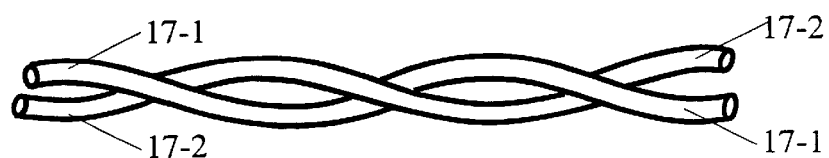

In a process 47, the central sections 19-1 and 19-2 are rotated or twisted about each other along the alignment axis AA by a selected angular displacement $\Delta\theta$ in a selected range (e.g., 360°–1080°), as illustrated in FIG. 2.

Figure 5B:
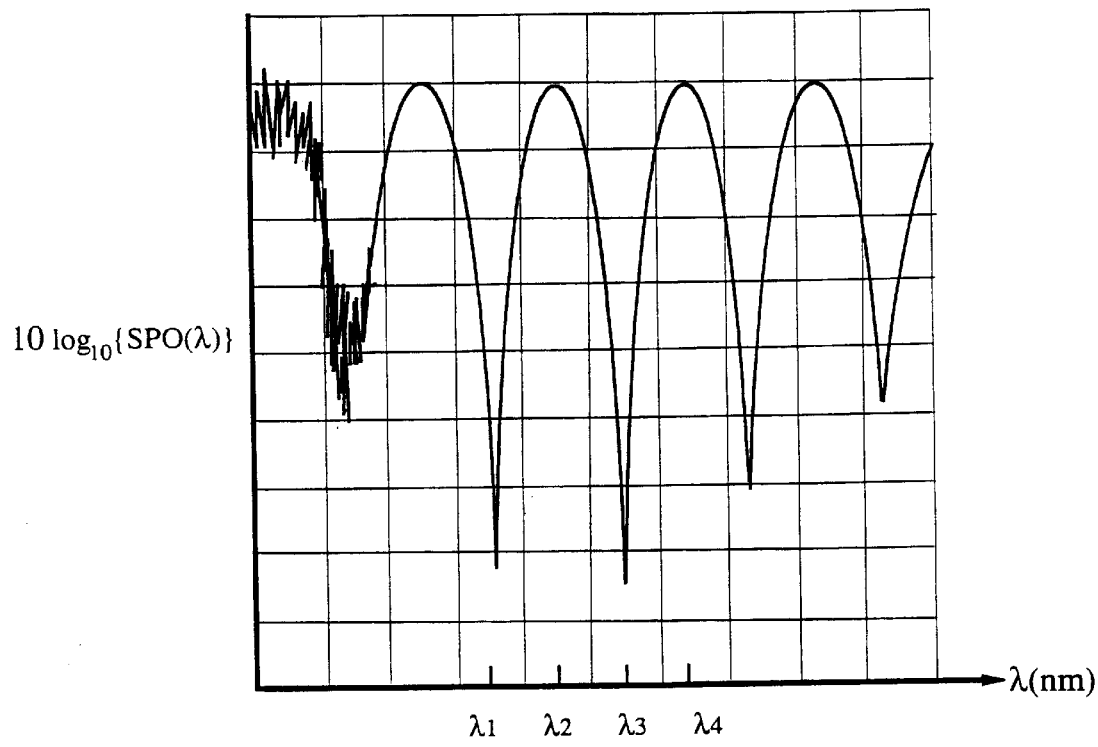

If the signal power output SPO($\lambda$) versus $\lambda$ is re-measured, a curve such as the one shown in FIG. 5B results, wherein (1) the measured pit wavelength value $\lambda 1=\lambda 1$(ITU), (2) the measured pit-to-pit spacing $\Delta\lambda \approx \Delta\lambda$ (ITU) and (3) the isolation factors, ISOL($\lambda 1$)=–22 dB and ISOL($\lambda 2$)$\approx$–23 dB, are markedly improved over the values shown in FIG. 5A (without twist). Optionally, one can repeat the processes 33–47 in order to further improve the isolation factors ISOL($\lambda 1$) and ISOL($\lambda 2$). Although this is not indicated in FIGS. 5A and 5B, the signal power output SPO($\lambda$) will normally be less dependent upon input signal polarization, as a result of application of the twist process 47.

The procedure disclosed herein will produce a fiber optic coupler, with two or more FO lines fused together, that is reasonably stable against mechanical stresses and elevated temperatures, with signal output coupling between the FO lines that is reasonably independent of input signal polarization, and that can be used to provide wavelength division multiplexing for signal communication at the ITU standards, with different signal wavelengths being preferentially propagated in each of the FO lines.

Figure 6A:
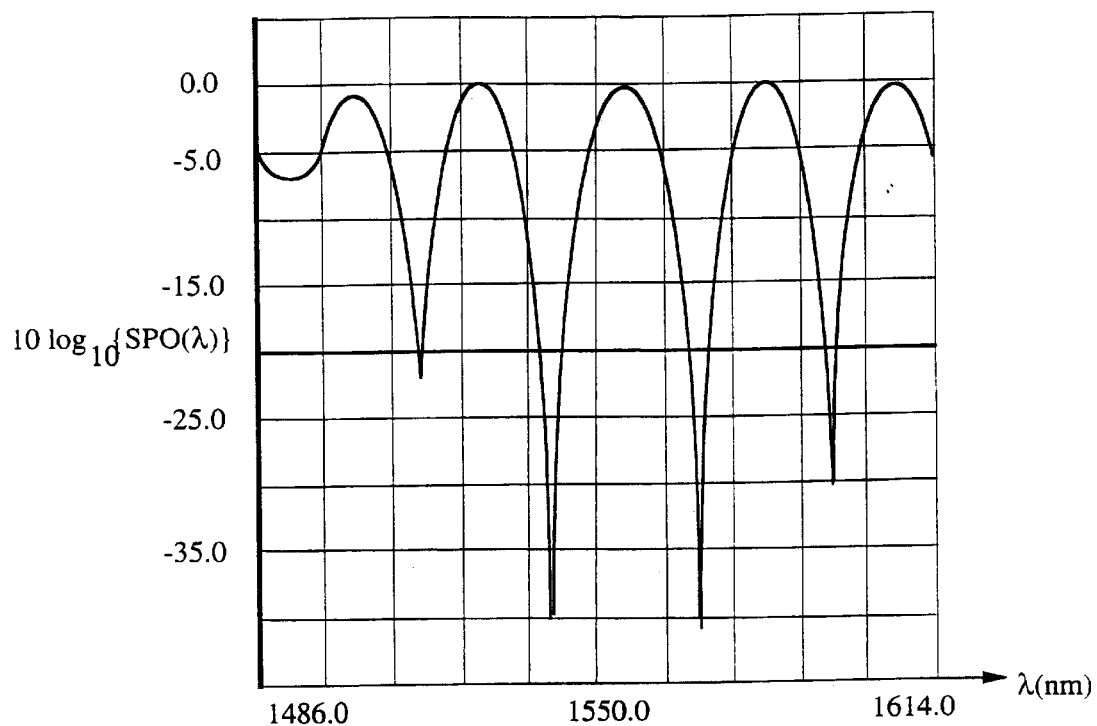
FIGS. 6A and 6B illustrate wavelength dependence of signal power output in two coupled fiber optic lines fabricated according to the invention.
Figure 6B:
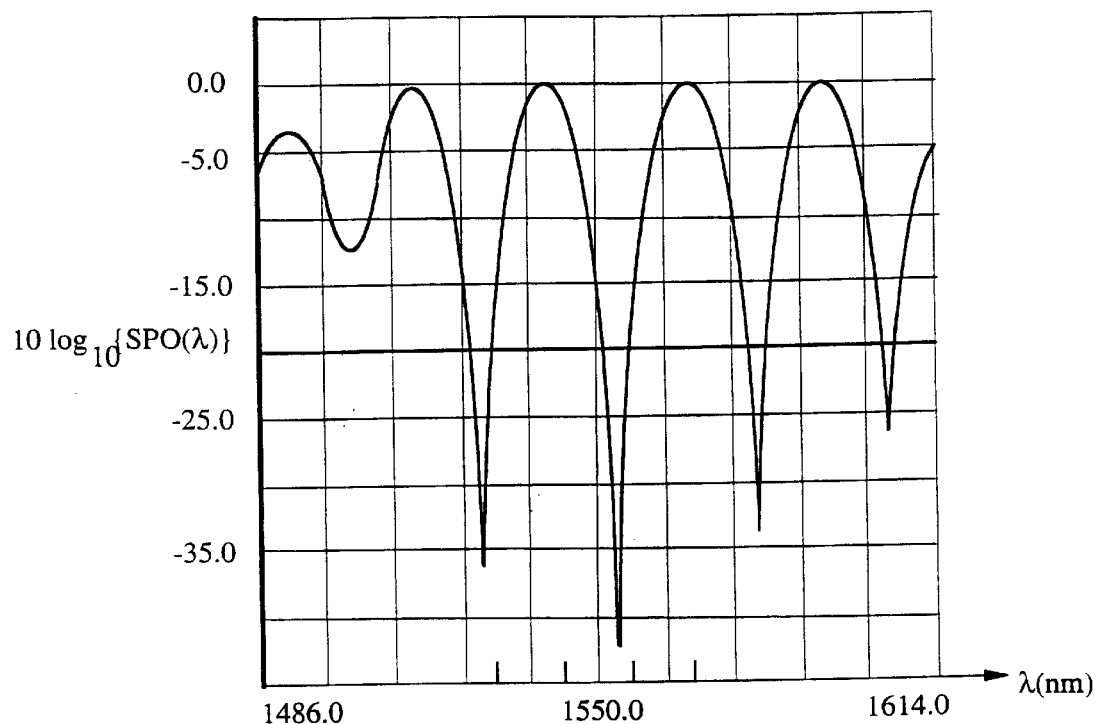

FIGS. 6A and 6B graphically illustrate wavelength dependence of signal power output SPO($\lambda$) versus $\lambda$ for each of two coupled FO lines or channels constructed according to the invention. In the FIG. 6A channel, SPO($\lambda$)$_{max}$ is set at approximately 0.0 dBm, which occurs approximately at the wavelength values $\lambda$=1505.2 nm, 1530.8 nm, 1556.4 nm, 1582.2 nm and 1607.6 nm; and the pits or local minima for SPO($\lambda$) occur approximately at $\lambda$=1518.0 nm (–20.5 dBm), 1543.6 nm (–39.5 dBm), 1569.2 nm (–39.5 dBm) and 1594.8 nm (–30 dBm).

In the FIG. 6B channel, SPO($\lambda$)$_{max}$ is set at approximately 0.0 dBm, which occurs approximately at the wavelength values $\lambda$=1492.4 nm, 1518.0 nm, 1556.4 nm, 1582.0 nm and 1607.6 nm; and the pits or local minima for SPO($\lambda$) occur approximately at $\lambda$=1505.2 nm (–13 dBm), 1530.8 nm (–35.5 dBm), 1556.4 nm (–42.5 dBm), at 1582.2 nm (–35 dBm) and at 1607.6 nm (–25.5 dBm). One verifies by comparison of FIGS. 6A and 6B that a wavelength of a local maxima for the FIG. 6A channel corresponds closely to a wavelength of a local minima for the FIG. 6B channel, and inversely. FIGS. 6A and 6B illustrate the wavelength discrimination or wavelength division available with use of an FO coupler constructed according to the invention.

Figure 7:
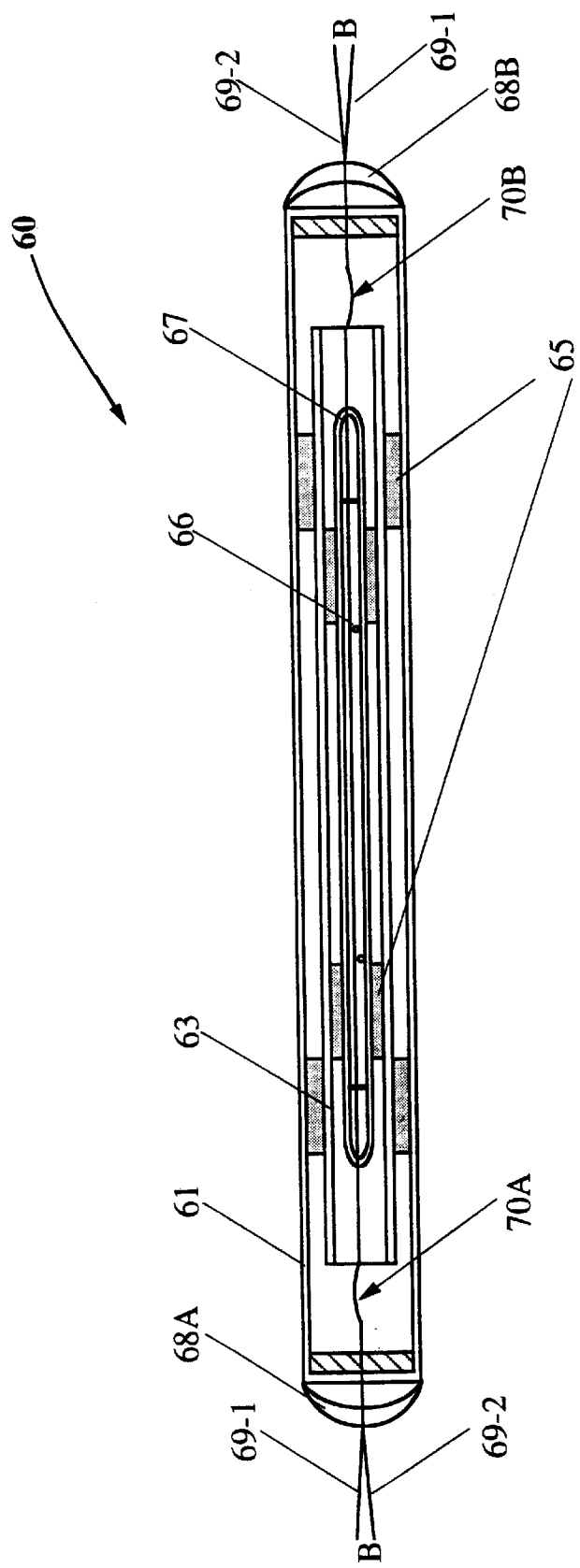
FIG. 7 is a schematic view of a WDM package prepared according to the invention.

FIG. 7 is a schematic view of a WDM package 60 using the fiber optic coupler fabricated according to the invention. The package 60 includes an evacuated outer (preferably cylindrical) tube or quartz boat 61 that encloses an inner (preferably cylindrical) tube 63, possibly having a different vacuum and/or a different temperature therein, with the inner tube being separated from the outer tube by two or more heat shrink rings 65A and 65B. A heat shrink (preferably cylindrical) tube 67 is preferably positioned within the inner tube, and the three tubes, 61, 63 and 67, are preferably aligned along a common axis BB. Adhesive used for the three tubes, 61, 63 and 67, and for the outer tube ends, 68A and 68B (preferably quartz), is preferably a standard epoxy mixed with quartz particles in order to match the thermal expansion coefficients of the adhesive and of the tube and tube end materials more closely to each other. An adhesive 66 used inside the heat shrink tube 67 is preferably a glue that is cured by irradiation with ultraviolet light.

Two (or more) FO lines, 69-1 and 69-2, are positioned along the axis BB, with the FO coupler, fabricated according to the invention, positioned within the heat shrink tube 67. Each of the FO lines, 69-1 and 69-2, between the ends of the heat shrink tube 67 and the ends of the outer tube 61 is given some slack, indicated by a wave or dip in the line in FIG. 6, rather than being pulled taut as in a conventional approach. The slack need not be more than a few percent extra length for each end of each FO line, 69-1 and 69-2. This slack allows the axial length of the outer tube 61 and/or the axial length of the inner tube 63 to increase relative to the axial length of the FO lines, 69-1 and 69-2, as a result of thermal expansion differences, without imposing extra stress on the FO lines, 69-1 and 69-2, as a result of forced elongation of the FO lines. Preferably, the thermal expansion coefficients of the adhesives and epoxy materials used to assemble the WDM package 60 are chosen to match as closely as possible the thermal expansion coefficients of the materials used for the quartz boat and/or the tubes 61, 63 and/or 67. This packaging approach reduces the sensitivity of the FO coupler and accompanying FO lines within the WDM package to some of the sources of mechanical stress and/or thermally-induced stress as a result of the extremes of the environment in which the WDM package operates.

What is claimed is:

1. A method for producing a stable fiber optic coupler of two or more lines, the method comprising:

positioning a selected section, having a selected length d, of at least two fiber optic lines, referred to as "FO lines", contiguous to each other and parallel to a selected alignment axis;

heating a selected central section of the FO lines to a first temperature T1 within a selected first temperature range for a first time interval of selected temporal length $\Delta t1$;

elongating the central section of the FO lines to a selected fractional elongation increment f lying in a selected fractional elongation range for a second time interval of a selected temporal length $\Delta t2$, where the first and second time intervals may overlap;

providing a selected input signal having at least a first selected wavelength component $\lambda 1$ and a second wavelength component $\lambda 2$, and providing a measurement of signal power output in at least one of the FO lines in response to the input signal at each of the wavelengths $\lambda 1$ and $\lambda 2$, where $\lambda 1$ and $\lambda 2$ are chosen to approximately correspond to two consecutive local minima in signal power output, with $\lambda 2 > \lambda 1$;

where $\lambda 1$ is greater than a selected wavelength value $\lambda 1$ (ITU), performing at least one of the following processes:

elongating the central section of the FO lines to a selected fraction elongation increment f1 for a third time interval of selected temporal length $\Delta t3$; and heating the central section of the FO lines to a selected second temperature T2 within a selected second temperature range for a fourth time interval of selected temporal length $\Delta t4$;

where $\lambda 1$ is less than the selected wavelength value $\lambda 1$ (ITU), reducing the fractional elongation increment to a selected increment $f2<f$ for a fifth time interval of selected temporal length $\Delta t5$; and heating the central section of the FO lines to a selected third temperature $T3<T1$ for a sixth time interval of selected temporal length $\Delta t6$, whereby the FO lines in at least part of the central section fuse to provide a fiber optic coupler having at least two output lines for electromagnetic signals.

2. The method of claim 1, further comprising twisting said FO lines by a selected angular displacement about each other along a twist axis that is substantially parallel to said alignment axis, for a seventh time interval of selected temporal length $\Delta t7$.

3. The method of claim 2, further comprising choosing said angular displacement to lie between 360° and 1080°.

4. The method of claim 1, further comprising choosing said first temperature range to be 1000° C.$\leq T \leq$1150° C.

5. The method of claim 1, further comprising choosing said second temperature range to be 1000° C.$\leq T \leq$1150° C.

6. The method of claim 1, further comprising choosing said third temperature range to be 800° C.$\leq T \leq$950° C.

7. The method of claim 1, choosing said fractional elongation increment range to include at least one fraction f in a range $0.001 \leq f \leq 1.0$.

8. The method of claim 1, further comprising choosing said fractional elongation increment f so that a difference $\lambda 2 - \lambda 1$ is approximately equal to a selected wavelength difference $\Delta\lambda$(ITU).

9. A fiber optic coupler produced by the method of claim 1.

* * * * *